United States Patent [19]

Falk

[11] Patent Number: 4,461,352

[45] Date of Patent: Jul. 24, 1984

[54] PROCESS FOR SELECTIVELY PLUGGING A SUBTERRANEAN FORMATION WITH A POLYMER GEL

[75] Inventor: David O. Falk, Denver, Colo.

[73] Assignee: Marathon Oil Company, Findlay, Ohio

[21] Appl. No.: 470,753

[22] Filed: Feb. 28, 1983

[51] Int. Cl.³ .................................... E21B 33/138
[52] U.S. Cl. ................................. 166/295; 166/300; 523/130; 524/512
[58] Field of Search ............ 166/270, 294, 295, 300; 405/264; 523/130; 524/512

[56] References Cited

U.S. PATENT DOCUMENTS

| | | | |
|---|---|---|---|
| 1,985,993 | 1/1935 | Herrmann et al. | 524/512 |
| 3,502,149 | 3/1970 | Pence, Jr. | 166/295 |
| 3,758,641 | 9/1973 | Zweigle | 524/512 |
| 3,794,115 | 2/1974 | Skagerberg | 166/294 |
| 3,795,276 | 3/1974 | Eilers et al. | 166/295 |
| 3,926,258 | 12/1975 | Hessert et al. | 166/294 |
| 4,022,741 | 5/1977 | Tuka et al. | 524/512 X |
| 4,098,337 | 7/1978 | Argabright et al. | 166/270 |
| 4,104,173 | 8/1978 | Gay et al. | 252/8.55 R |
| 4,155,405 | 5/1979 | Vio | 405/264 |
| 4,199,625 | 4/1980 | Pilny et al. | 166/295 X |
| 4,290,485 | 9/1981 | Free et al. | 166/295 X |

Primary Examiner—George A. Suchfield
Attorney, Agent, or Firm—Jack L. Hummel; Rodney F. Brown

[57] ABSTRACT

The highly permeable zones of a subterranean formation are selectively plugged by injecting an aqueous solution of an acrylamide polymer, an aldehyde and a borate salt via a well into the highly permeable zones. The solution forms a non-flowing, water-soluble polymer gel in situ at a temperature of from about 20° C. to 100° C. at an alkaline pH over a period of from about 2 to 72 hours. The polymer gel plugs the highly permeable zones.

21 Claims, No Drawings

PROCESS FOR SELECTIVELY PLUGGING A SUBTERRANEAN FORMATION WITH A POLYMER GEL

DESCRIPTION

1. Technical Field

The invention relates to a process for selectively plugging highly permeable zones in a subterranean formation wherein in situ gelation of an injected acrylamide polymer is delayed until the polymer has fully penetrated the highly permeable zones.

2. Background Art

Fluids preferentially migrate into highly permeable zones in subterranean formations. This migration is undesirable when injecting treatment fluids into hydrocarbon-bearing formations for post-primary recovery of residual hydrocarbons. The treatment fluids channel through the highly permeable zones, bypassing the less permeable zones. The result is poor conformance and flow profiles of the treatment fluid in the formation. The hydrocarbons residing in the less permeable zones are not produced and the overall yield of hydrocarbons from the formation is reduced.

Highly permeable zones in subterranean formations are plugged to prevent migration of treatment fluids into them and to divert treatment fluids into adjacent less permeable zones. One plugging method is to inject plugging fluids such as polymer gels into the formation prior to treatment fluids. The gel components are injected into the highly permeable zones in a relatively low viscosity, fluid state. They preferentially enter and plug the highly permeable zones of the formation. Subsequently injected treatment fluids are diverted into less permeable zones facilitating recovery of the hydrocarbons therein.

It is desirable to delay gelation of injected fluids until the entire gel composition has completely penetrated the highly permeable zones. A number of processes are known in the prior art for delaying in situ gelation of a polymer. In U.S. Pat. No. 3,926,258 to Hessert et al, a polymer and a cross-linking agent are injected into a formation. A complexing agent added to the injected fluids initially complexes the cross-linking agent. The complexes disassociate over time, thereby gelating the polymer.

U.S. Pat. No. 3,794,115 to Skagerberg teaches a process whereby water-soluble polymers containing branched hydroxyl groups such as polygalactomannan gums or polyvinyl alcohols are cross-linked by borate ions in an aqueous dispersion. Borax glass beads are the source of the borate ion cross-linking agent. The rate of gelation is a function of the borax glass dissolution rate in the aqueous dispersion.

U.S. Pat. No. 4,104,173 to Gay et al teaches a process for in situ gelation of an injected liquid hydrocarbon. An acidic partial aluminum salt is mixed with a hydrocarbon to produce a non-thickened fluid, which is injected into a subterranean formation. The fluid is neutralized in situ with a base such as borax to produce a pseudo-double salt. The resulting pseudo-double salt is an effective gelling agent of the hydrocarbon.

The above-cited prior art processes delay polymer gelation by specifically inhibiting the activity of the cross-linking agent. The processes require strict control of gelation conditions. Improper control results in premature polymer gelation, which subjects the polymer gel to irreversible shear degradation when moving into and through the formation. The sensitivity of the prior art processes to gelation conditions diminishes their ability to plug highly permeable zones.

An in situ process is needed to plug highly permeable zones in a subterranean formation whereby the gel components remain in a relatively low viscosity, fluid state until they are fully in place in the formation. Such a process provides extensive and deep penetration of the gel into the highly permeable zones. A process is needed, which enables one to mix all of the gel components in situ or at the surface without premature gelation.

DISCLOSURE OF THE INVENTION

The present invention provides a process for selectively plugging highly permeable zones in a subterranean formation with a polymer gel. An aqueous solution of an acrylamide polymer, an aldehyde and a borate salt is injected into an alkaline formation environment. The solution preferentially migrates into the highly permeable zones of the formation. Immediate gelation is delayed by an intermediate reaction. Delayed gelation enables the relatively low viscosity gel solution to extensively and deeply penetrate the highly permeable zones. The solution gels in situ to produce a water-soluble, substantially non-flowing polymer gel which plugs the highly permeable zones.

BEST MODE FOR CARRYING OUT THE INVENTION

The present invention relates to a process for delayed in situ gelation of a water-soluble, acrylamide polymer. An acrylamide polymer, an aldehyde and a borate salt are combined in an aqueous solution. The resulting solution is injected into the highly permeable zones of a subterranean formation. Gelation occurs over time in an alkaline environment to form a substantially non-flowing, water-soluble polymer gel, which plugs the highly permeable zones.

A gel is defined as a colloidal suspension of a liquid in a solid. The present polymer gel is a non-flowing composition made up of water suspended within a solid network of cross-linked polymers. The cross-linked polymer network results from a weak ionic association of polymers and ionic cross-linking agent. The weak ionic association imparts a non-flowing yet non-rigid character to the gel. Gelation is the process whereby the gel components associate.

The polymer building block of the polymer gel is a water-soluble acrylamide polymer. The acrylamide polymer is either a polyacrylamide homopolymer or a copolymer containing acrylamide. Up to about 40% of the amide groups of the polyacrylamide homopolymer can be hydrolyzed, i.e. up to 40% of the amide groups can be converted to carboxyl groups, leaving the remaining 100% to about 60% of the amide groups unhydrolyzed. The copolymer is comprised of acrylamide and a second suitable monomer. Examples of the suitable monomer include styrene, acrylonitrile, methylacrylate, methyl methylacrylate, vinyl acetate, sodium acrylate and the like. The copolymer contains from about 99.99% to about 60% by weight unhydrolyzed acrylamide groups and from about 0.01% to about 40% by weight of the second monomer, which is preferably sodium acrylate. The unhydrolyzed polyacrylamide homopolymer containing 100% unhydrolyzed acrylamide groups is the most preferred acrylamide polymer.

The acrylamide polymer has a molecular weight of from about 100,000 to about 10,000,000 and preferably about 1,000,000 to about 6,000,000.

Preparation of the acrylamide polymer is known to one of ordinary skill in the art. Polyacrylamides can be prepared by polymerizing an aqueous solution of acrylamide with known catalyst systems. The resulting polyacrylamide is thereafter diluted with water. U.S. Pat. No. 4,034,809 to Phillips et al teaches a method for partial hydrolysis of polyacrylamide.

The aldehyde is either a monoaldehyde or a dialdehye. The aldehyde preferably contains from one to about four carbon atoms. Exemplary monoaldehydes are formaldehyde and acetaldehyde. Glyoxal is an exemplary dialdehyde. Formaldehyde is the most preferred aldehyde.

The borate salt contains a metal and the borate radical, $B_4O_7^=$. The preferred borate salt is hydrated sodium borate, commonly known as borax, of the formula $Na_2B_4O_7.10\ H_2O$. Borax is a water-soluble solid which ionizes in water to produce the borate ion. Borax is soluble in water at a saturation level of 22g of borax in 100 ml of water at 62° C.

According to one embodiment, the gel components are mixed above ground at ambient atmospheric temperature, about 20° C. A concentrated aldehyde solution is added to an aqueous solution containing the acrylamide polymer. Any aqueous solvent such as brine or fresh water may be used. However, soft water is the preferred aqueous solvent. A concentrated sodium borate solution is finally added to the solution.

An excess of aldehyde groups and borate ions is desirable in the gel solution to ensure substantial gelation of the polymer. However, the amount of borate ion which can be combined with the gel solution is limited by the solubility of borax in water. Therefore, the equivalent ratio of borate ions to unhydrolyzed acrylamide groups in the gel solution groups is at least about 0.10:1. The equivalent ratio of aldehyde groups to unhydrolyzed acrylamide groups in the gel solution is at least about 1:1.

Where unhydrolyzed polyacrylamide, formaldehyde and borate ion are the components of the gel, the relative weight concentrations of the gel components initially present in the gel solution are as follows. The concentration of polyacrylamide is from about 0.1% to about 1.0% and preferably it is about 0.5%. The concentration of formaldehyde is from about 0.5% to about 10% and preferably about 0.5% to about 2%. The most preferred concentration is about 0.75%. The concentration of borate ion is from about 0.05% to about 1% and preferably from about 0.10% to about 0.60%.

It is necessary that gelation be carried out in an alkaline environment. The formation water is generally slightly alkaline due to natural carbonate rock. However, according to one embodiment the formation is pre-flushed with an alkaline solution to adjust the pH of the formation water to an optimal level for resin formation. The pH of the formation water is preferably adjusted within a range of from about 7 to about 12 and most preferably from about 9 to about 11. The pH of the formation water can be adjusted by pre-flushing with basic organic compounds, basic inorganic hydroxide compounds or basic buffer compounds. Examples of basic compounds include sodium hydroxide, inorganic and quaternary ammonium hydroxides, organic amines, and sodium phosphate buffer. Sodium phosphate buffer is the preferred base.

The preferred embodiment is to add the base directly to the gel solution at the surface in an amount such that the pH of the gel solution is from about 7 to about 12 and preferably about 9 to about 11. About 20 to about 100 barrels of the gel solution are immediately injected into the highly permeable zones via a well at a rate of about 100 to about 400 barrels per day before the solution substantially increases in viscosity. The preference of the reaction solution to enter the highly permeable zones can be further ensured by the use of packers.

The temperature of the formation water must be within a range of from about atmospheric, 20° C., to about 100° C. and preferably about 40° C. to about 60° C. for gelation to proceed. The gelation temperature can be regulated in situ to a certain degree by injecting fluid at predesigned temperatures.

The gelation time is a function of gelation temperature, pH, and concentration of the gel components. The gelation time is the time interval from the initial contacting of the gel components until a substantially non-flowing gel is produced. The gelation parameters are controlled within the ranges given herein such that gelation does not occur at least until the gel components are in place in the formation. The gelation time is from about 2 to about 72 hours and preferably about 24 to about 48 hours.

A high injection rate of the gel components is used in conjunction with a relatively short gelation time of about 2 to 24 hours. At a high injection rate, the gel components achieve the same complete penetration of the highly permeable zones over a short period of time as at a low injection rate over a long period of time.

The viscosity of the gelation solution increases as gelation progresses. Gelation is near completion when the viscosity of the gel product exceeds 166,000 centipoise (cps). Upon completion of gelation, the polymer gel sets to a non-flowing, water-soluble gel in the highly permeable zones of the formation. If a packer has been used, it is removed from the well bore. Post-primary treatment fluids such as water, polymer, micellar/-polymer, etc. are injected into the formation to enhance recovery of hydrocarbons therefrom.

The mechanism for delayed polymer gelation is believed to be two steps: (1) methylolation and (2) cross-linking. Methylolation is a chemical reaction at the unhydrolyzed amide branch of the acrylamide polymer. Aldehyde methylolates the acrylamide polymer resulting in the intermediate, methylolated acrylamide polymer. The cross-linking step is an ionic association between the methylolated intermediates and borate ions. Cross-linking cannot occur until after methylolation takes place. The length of the gelation delay is a function of the methylolation rate; the slower the methylolation rate, the longer the gelation delay.

The methylolation reaction rate is controlled by fixing the aldehyde concentration and reaction pH for a given amount of polymer. Decreasing the formaldehyde concentration to no lower than about 0.5% by weight in the gel solution and/or decreasing the reaction pH to no lower than about 9 lowers the methylolation rate. Going below these lower limits completely blocks methylolation and in turn prevents gelation of the polymer. Likewise, the upper pH limit cannot be exceeded. At a pH above about 12 the amide groups hydrolyze. If too many sites on the polymer hydrolyze, insufficient cross-linking sites are available to create a non-flowing gel.

Gelation occurs when the borate ions cross-link the methylolated acrylamide polymer. Borate ions are produced by ionization of the borate salt present in the gel solution. The cross-link is an ionic association of an OH group on the methylolated polymer and an oxygen on the borate ion.

The borate salt is either co-mixed with the acrylamide polymer and aldehyde or is added subsequent to mixing the polymer and aldehyde. In either case, cross-linking of the polymer does not occur until the borate salt is added to the solution.

Optimizing the limits of the gelation parameters is a trade-off between the objectives to delay gelation and to produce a high viscosity gel. The limits of the gelation parameters are set such that methylolation occurs at a slow rate, yet sufficient methylolated polymers are produced to enable extensive cross-linking of the polymer.

The physical properties of the polymer gel are dependent on the degree of cross-linking, which occurs between the methylolated polymers. The greater the number of reaction sites present on the starting polymer and intermediate methylolated polymer, the higher the degree of cross-linking in the gel. A high degree of cross-linking among the polymers creates a non-flowing, more stable gel. The most preferred polymer contains the greatest number of reaction sites. Unhydrolyzed polyacrylamide has the greatest number of reaction sites, because of its high concentration of reactive amide groups.

The present process for making the polymer gel is not limited by the particular mechanism described herein. By practicing this process other gelation mechanisms are possible, which are within the scope of this invention.

The following examples are illustrative of the present invention and are not to be construed as limiting the scope thereof. All concentrations are given on a percent by weight basis unless noted otherwise.

EXAMPLE 1

A 0.5% aqueous unhydrolyzed polyacrylamide solution is made by diluting a 6% unhydrolyzed polyacrylamide solution with water. 1 ml of a 37% concentrated formaldehyde solution is combined with 50 ml of the 0.5% polyacrylamide solution. 1 ml of 22% borax solution is then added to the solution resulting in relative concentrations of about 0.5% polyacrylamide, 0.75% formaldehyde and 0.18% borate ion in the gel solution. 1.75 ml of sodium phosphate buffer solution is added to adjust the initial pH of the mixture to 10.5. The solution is maintained at a temperature of 50° C. in a water bath. The Brookfield viscosity reading and pH of gelation as it progresses is recorded in the table below. After 72 hours the product is a non-flowing polymer gel with a viscosity greater than 166,000 cps.

EXAMPLE 2

Polyacrylamide and formaldehyde are combined in the same manner and amounts as Example 1. An amount of sodium phosphate buffer solution is added to this solution to adjust the initial pH to 10.5. The solution is maintained at a temperature of 50° C. in a water bath. After 20.25 hours have elapsed, the pH of solution is 9.05. 1 ml of borax solution is added to the solution. The Brookfield viscosity readings and pH of gelation as it progresss are recorded in the table below. After 168 hours the product is a gel with a Brookfield viscosity reading of 6.5 TF. This converts to a viscosity of only 10,790 cps.

TABLE

| Example | Reaction Time (hr) | pH | Brookfield Viscosity Reading* |
|---|---|---|---|
| 1 | 0 | 10.5 | 1.7 TB |
|  | 2 | — | 3.4 TB |
|  | 18.5 | 10.2 | 5.9 TB |
|  | 42.5 | 10.15 | 23 TB |
|  | 72.0 | 9.95 | 100+ TB, 100+ TF |
| 2 | 0 | 10.5 | 4 |
|  | 2.25 | — | 4.4 |
|  | 18.25 | 9.7 | 5.6 |
|  | 20.25 | 9.05 | — |
|  | 22.75 | — | 4.5 |
|  | 42.25 | 9.15 | 6.5 |
|  | 72.0 | 9.0 | 11.9 |
|  | 168.0 | — | 100+ TB, 6.5 TF |

*166,000 (0.01 × TF reading) = viscosity in cps
6,660 (0.01 × TB reading) = viscosity in cps

EXAMPLE 3

A hydrocarbon-bearing formation contains water having a temperature of 50° C. and a pH of 7. A concentrated sodium phosphate buffer solution is injected into the formation until the pH of the formation water reaches 10.5. 50 barrels of an aqueous solution is prepared of 0.05% polyacrylamide, 0.75% formaldehyde, and 0.2% borate ion. The solution is at an ambient temperature of 20° C. and has a pH of 7.5. The entire amount of the solution is injected into the formation at a rate of 200 barrels per day via a well. The solution preferentially enters the highly permeable zones of the formation. Upon fully penetrating the highly permeable zones the solution begins to gel. After 72 hours, the solution sets in the highly permeable zones to a non-flowing, water-soluble polymer gel. The polymer gel substantially reduces migration of fluids into the highly permeable zones.

The process of delaying polymer gelation as described in the present invention is useful in the post-primary recovery of hydrocarbons from subterranean formations. The process can also be applied to other subterranean uses where it is necessary to plug a fluid permeable zone.

While the foregoing preferred embodiment of the invention has been described and shown, it is understood that the alternatives and modifications, such as those suggested and others, may be made thereto and fall within the scope of the invention.

What is claimed is:

1. A process for selectively plugging highly permeable zones of a subterranean formation comprising the steps of:
   (a) injecting an acrylamide polymer, an aldehyde and a borate salt into the highly permeable zones via a well in fluid communication with said zones, wherein the equivalent ratio of aldehyde groups to unhydrolyzed acrylamide groups injected into said zones is at least about 1:1 and the equivalent ratio of borate ions to unhydrolyzed acrylamide groups injected into said zones is at least about 0.10:1; and
   (b) gelling said acrylamide polymer, aldehyde and borate salt in situ at a temperature of from about 20° C. to about 100° C. and a pH of from about 7 to about 12 for a gelation time of from about 2 to about 72 hours to produce a polymer gel which substantially plugs said highly permeable zones.

2. The process of claim 1 wherein said acrylamide polymer, aldehyde and borate salt are combined in an aqueous solution at ambient atmospheric temperature prior to injecting into said zones.

3. The process of claim 2 wherein the pH of said solution is adjusted to from about 7 to about 12 prior to injecting said solution.

4. The process of claim 2 wherein the pH of said solution is adjusted from about 9 to about 11 prior to injecting said solution.

5. The process of claim 3 or 4 wherein the pH of said solution is adjusted by adding a sodium phosphate buffer.

6. The process of claim 1 wherein the molecular weight of said acrylamide polymer is from about 100,000 to about 10,000,000.

7. The process of claim 6 wherein the molecular weight of said acrylamide polymer is from about 1,000,000 to about 6,000,000.

8. The process of claim 7 wherein said acrylamide polymer is polyacrylamide wherein about 0% to about 40% of the amide groups are hydrolyzed.

9. The process of claim 8 wherein about 100% of the amide groups of said polyacrylamide are unhydrolyzed.

10. The process of claim 1 wherein said aldehyde contains up to about 4 carbon atoms.

11. The process of claim 10 wherein said aldehyde is formaldehyde.

12. The process of claim 1 wherein said borate salt is borax.

13. The process of claim 1 wherein said acrylamide polymer, aldehyde and borate salt are gelled at a temperature of from about 40° C. to about 60° C.

14. The process of claim 1 wherein said gelation time is from about 24 hours to about 48 hours.

15. The process of claim 1 wherein the pH of water within said formation is adjusted to from about 9 to about 11 by pre-flushing said formation with an alkaline solution prior to injecting said acrylamide polymer, aldehyde and borate salt.

16. A process for gelation of an acrylamide polymer comprising the steps of:
  (a) combining the acrylamide polymer with an aldehyde and a borate salt in an alkaline aqueous solution, wherein the equivalent ratio of aldehyde groups to unhydrolyzed acrylamide groups is at least about 1:1 and the equivalent ratio of borate ions to unhydrolyzed acrylamide groups is at least about 0.10:1; and
  (b) gelling said solution at a temperature of from about 20° C. to about 100° C. and at a pH of from about 7 to about 12 for a gelation time of from about 2 to about 72 hours to produce a polymer gel.

17. The process of claim 16 wherein said acrylamide polymer is 100% unhydrolyzed polyacrylamide, said aldehyde is formaldehyde and said borate salt is borax; and the initial concentration in said solution of said polyacrylamide is from about 0.1% to about 1.0% by weight, said formaldehyde is from about 0.5% to about 10% by weight and said borate ion is from about 0.05% to about 1.0% by weight.

18. The process of claim 17 wherein the molecular weight of said polyacrylamide is from about 1,000,000 to about 6,000,000.

19. The process of claim 17 wherein said solution is gelled at a temperature of from about 40° C. to about 60° C.

20. The process of claim 17 wherein the pH of said solution is adjusted to from about 9 to about 11.

21. The process of claim 17 wherein said gelation time is from about 24 to about 48 hours.

* * * * *